United States Patent [19]
Maruyama et al.

[11] Patent Number: 6,153,853
[45] Date of Patent: Nov. 28, 2000

[54] LASER BEAM WELDING APPARATUS

[75] Inventors: Iwao Maruyama, Kawagoe; Kenji Makihara; Kazuo Isogai, both of Sayama, all of Japan

[73] Assignee: Honda Giken Kogyo Kabushiki Kaisha, Tokyo, Japan

[21] Appl. No.: 08/992,574

[22] Filed: Dec. 17, 1997

[30] Foreign Application Priority Data

Dec. 25, 1996 [JP] Japan ................................ 8-345523
Dec. 25, 1996 [JP] Japan ................................ 8-345527

[51] Int. Cl.$^7$ .......................... B23K 26/04; B23K 26/10; B23K 26/22
[52] U.S. Cl. ............................ 219/121.63; 219/121.81; 219/121.83; 228/7; 228/8; 228/42; 228/44.3
[58] Field of Search .................. 219/121.63, 121.64, 219/121.79, 121.81, 121.83, 121.84, 121.82; 228/102, 7, 8, 42, 44.3, 212, 219

[56] References Cited

U.S. PATENT DOCUMENTS

| | | |
|---|---|---|
| 4,654,505 | 3/1987 | Sciaky et al. . |
| 4,972,062 | 11/1990 | Aharon . |
| 4,973,817 | 11/1990 | Kanno et al. ...................... 219/121.63 |
| 5,064,991 | 11/1991 | Alborante ........................... 219/121.63 |
| 5,115,115 | 5/1992 | Alborante . |
| 5,153,409 | 10/1992 | Rudaitis et al. . |
| 5,221,823 | 6/1993 | Usui . |
| 5,359,872 | 11/1994 | Nashiki ................................ 219/121.8 |
| 5,380,978 | 1/1995 | Pryor .................................. 219/121.64 |

FOREIGN PATENT DOCUMENTS

| | | |
|---|---|---|
| 0440002A1 | 8/1991 | European Pat. Off. . |
| 1-197092 | 8/1989 | Japan ................................ 219/121.63 |
| 1-205894 | 8/1989 | Japan ................................ 219/121.84 |
| 1-262085 | 10/1989 | Japan . |
| 4-36792 | 6/1992 | Japan . |
| 4-220187 | 8/1992 | Japan . |
| 5-131282 | 5/1993 | Japan . |
| 6-124114 | 5/1994 | Japan . |
| 8-90266 | 4/1996 | Japan . |

*Primary Examiner*—Samuel M. Heinrich
*Attorney, Agent, or Firm*—Birch, Stewart Kolasch & Birch, LLP

[57] ABSTRACT

The position of a workpiece delivered into a welding station by a feed mechanism is detected by CCD cameras of position detectors, and a positioning error of the workpiece with respect to a reference position is determined on the basis of the detected position. After training data for welding robots is corrected on the basis of the determined positioning error, scan heads on distal ends of the welding robots are inserted into the workpiece. After the scan heads have been inserted to predetermined positions in the workpiece, only the scan heads are actuated to weld the workpiece at a plurality of locations thereof with a laser beam.

6 Claims, 9 Drawing Sheets

LASER BEAM WELDING APPARATUS

BACKGROUND OF THE INVENTION

1. Field of the Invention

The present invention relates to a laser beam welding apparatus having welding robots with scan heads for welding a workpiece at a plurality of locations thereon highly efficiently with laser beams.

2. Description of the Related Art

Resistance spot welding robots have heretofore been used to weld inner and outer panels of automobile bodies, for example. The resistance spot welding robots have a welding gun movable to various welding locations on an automobile body that has been delivered to a predetermined welding station.

Since the welding gun of the resistance spot welding robots is relatively heavy, it takes a considerable period of time to move the welding gun through the welding locations. Therefore, workpieces cannot efficiently be welded by the resistance spot welding robots. The time required to weld a workpiece may be shortened by increasing the number of welding robots used.

However, simply increasing the number of welding robots used would result in an increase in investments for the welding facility and also an increase in the length of the welding line because of installation spaces required by the welding robots. The welding guns of the resistance spot welding robots weld workpieces with welding tips thereof which are held in contact with the workpieces. Consequently, the welding tips tend to stick to the workpiece and are subject to wear. It is thus necessary to monitor the welding tips at all times for their sticking to the workpiece, and to shut down the welding line and take necessary measures when the welding tips stick to the workpiece. Furthermore, the welding tips need to be dressed periodically for welding workpieces under optimum welding conditions.

To eliminate the shortcomings of the resistance spot welding robots, a welding robot for welding an automobile body with a laser beam has been proposed as disclosed in Japanese laid-open patent publication No. 4-220187. The disclosed welding robot has a laser beam applying head mounted on a tip end thereof and movable to a position near a welding location of the automobile body for effecting a desired welding operation on the automobile body. The disclosed welding robot is free from the problem of sticking and wear of a welding tip.

However, inasmuch as the laser beam applying head is brought into a given position near a welding location of the automobile body upon movement of the welding robot, it is impossible to move the laser beam applying head at a relatively high speed. There is no guarantee that the automobile body to be welded will accurately be positioned with respect to the welding robot and hence that the automobile body will accurately be welded.

Another conventional welding apparatus disclosed in Japanese patent publication No. 4-36792 has a plurality of welding heads that can be positioned in the vicinity of a welding location on a workpiece. A desired one of the welding heads is selected by adjusting the angle of a plane mirror, and a laser beam is applied from the selected welding head to the welding location on the workpiece. The disclosed welding apparatus is capable of welding a plurality of locations on the workpiece within a relatively short period of time.

However, because the welding heads are fixed relatively to the workpiece, they cannot effect continuous welding, i.e., seam welding, on the workpiece though they can spot-weld the workpiece at given locations thereon. Furthermore, inasmuch as the welding heads are required for each of welding locations on the workpiece, the welding apparatus is highly expensive. In addition, the positions and number of the welding heads have to be changed depending on the type of the workpiece to be welded, and such a changing process is tedious and time-consuming. The welding heads that are positioned near welding locations on the workpiece tend to be contaminated due to sputtering in a welding process, resulting in a reduction in the welding accuracy.

SUMMARY OF THE INVENTION

It is therefore an object of the present invention to provide a laser beam welding apparatus which is capable of efficiently welding workpieces highly accurately and needs a minimum amount of investments for welding facility and a minimum installation space.

Another object of the present invention is to provide a laser beam welding apparatus which can easily and accurately position welding robots with respect to welding locations on a workpiece.

Still another object of the present invention is to provide a laser beam welding apparatus for welding a workpiece at a plurality of locations thereon highly efficiently with welding robots without moving the welding robots and increasing the number of the welding robots.

Yet still another object of the present invention is to provide a laser beam welding apparatus that needs a minimum amount of maintenance as possible.

A further object of the present invention is to provide a laser beam welding apparatus capable of effecting both spot welding and seam welding on a workpiece.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
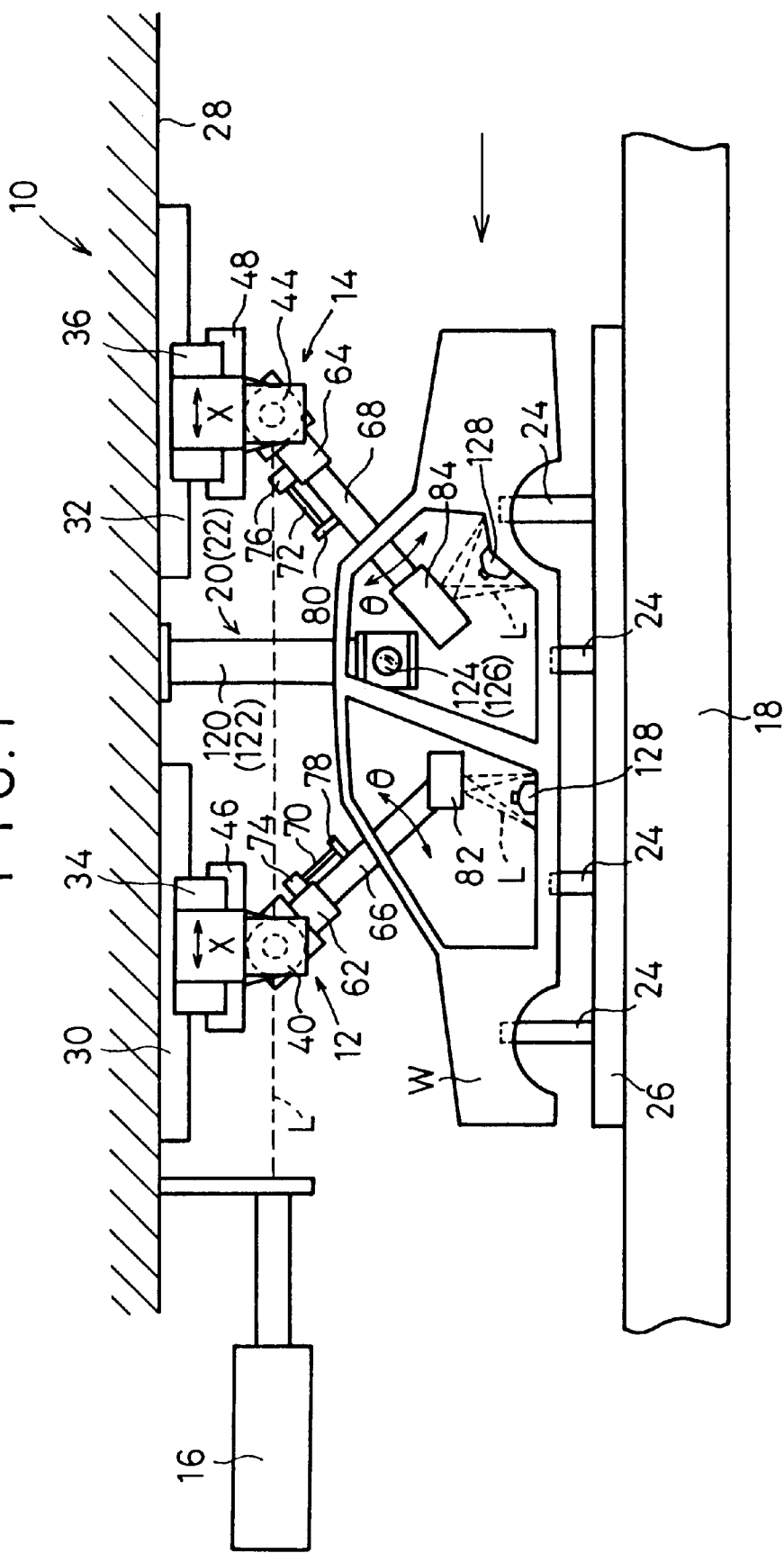
FIG. 1 is a side elevational view of a laser beam welding apparatus according to a first embodiment of the present invention.
Figure 2:
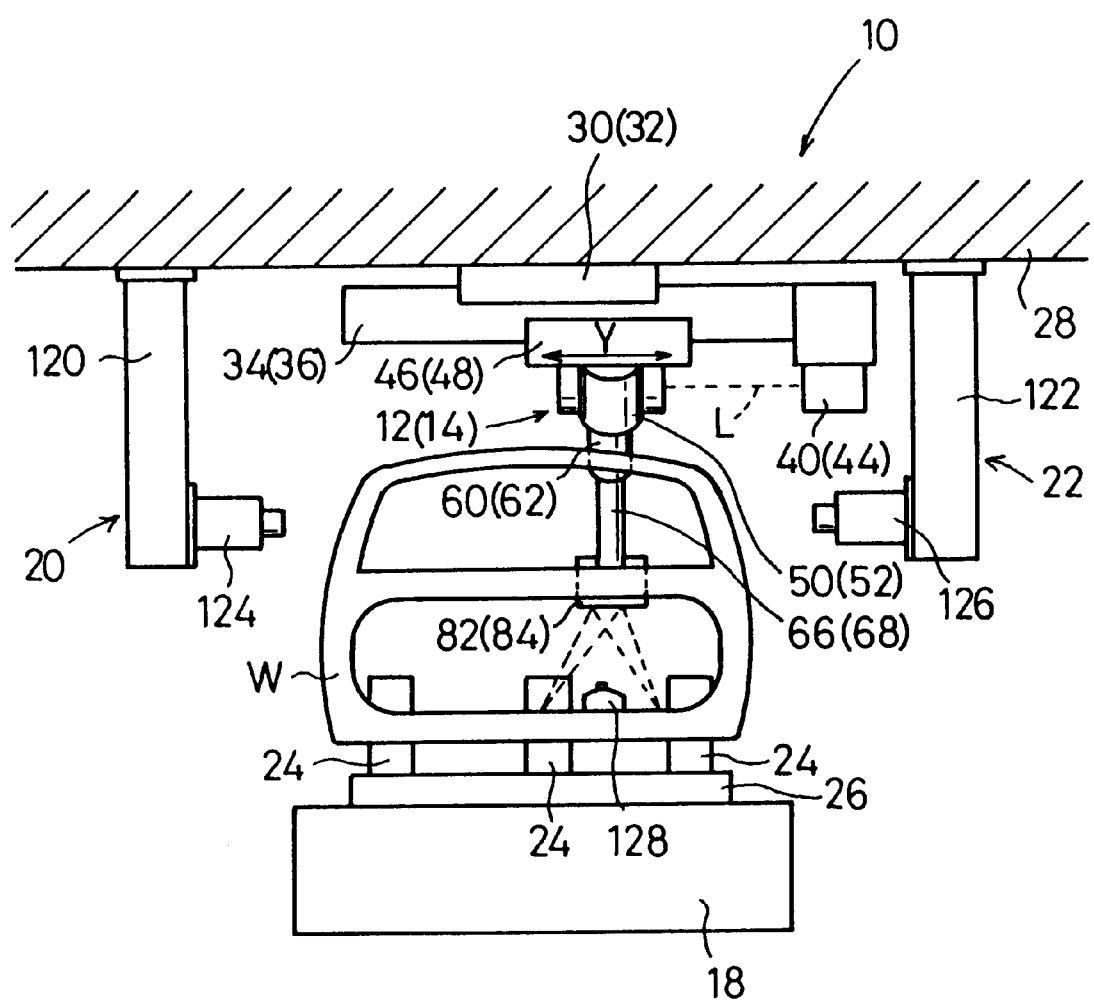
FIG. 2 is a front elevational view of the laser beam welding apparatus according to the first embodiment.

As shown in FIGS. 1 and 2, a laser beam welding apparatus 10 according to a first embodiment of the present invention generally comprises two welding robots 12, 14 installed in a welding station, a laser beam emitting device 16 for supplying a laser beam L to the welding robots 12, 14, a feed mechanism 18 for delivering a workpiece W, which is illustrated as an automobile body, to the welding station, and two position detectors 20, 22 positioned one on each side of the welding station for detecting the position of the workpiece W that has been delivered to the welding station. The workpiece W is carried on a delivery carriage 26 by a plurality of clamps 24 and delivered to the welding station by the delivery carriage 26.

Figure 3:
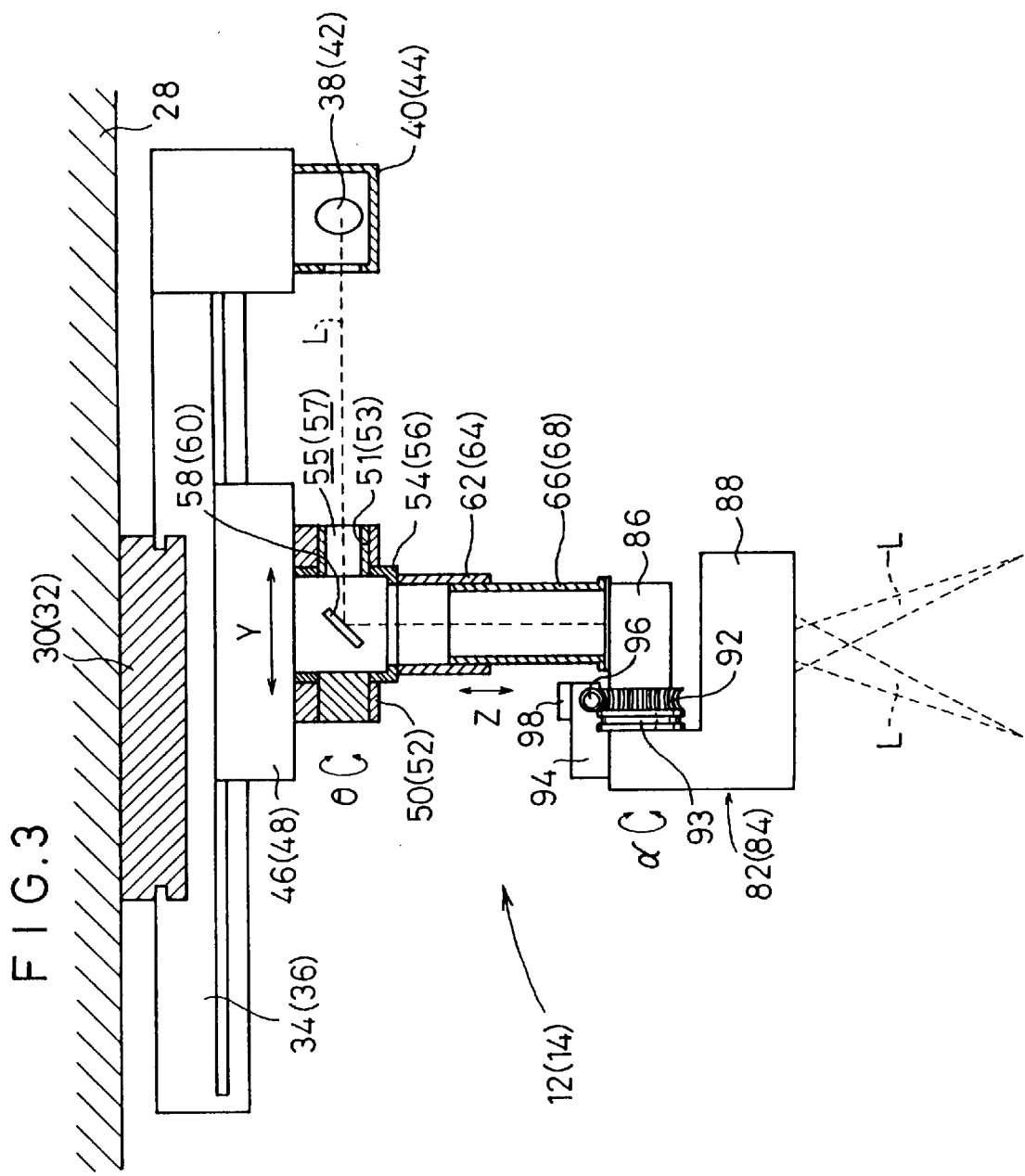
FIG. 3 is a front elevational view of a welding robot of the laser beam welding apparatus according to the first embodiment.

Each of the welding robots 12, 14 will be described in detail with reference to FIG. 3. The welding station has an upper plate 28 spaced upwardly from the feed mechanism 18. The welding robots 12, 14 have respective guide rails 30, 32 disposed on a lower surface of the upper plate 28 and respective first slides 34, 36 slidably mounted on the respective guide rails 30, 32. A casing 40 which houses a shift mirror 38 is attached to an end of the first slide 34 of the welding robot 12. Similarly, a casing 44 which houses a reflecting mirror 42 is attached to an end of the first slide 36 of the welding robot 14 (see FIG. 1). Second slides 46, 48 are slidably mounted on the respective first slides 34, 36. The first slides 34, 36 are horizontally movable along the respective guide rails 30, 32 in the directions indicated by the arrow X, and the second slides 46, 48 are horizontally movable along the respective first slides 34, 36 in the directions indicated by the arrow Y.

Casings 54, 56 are angularly movably mounted on the respective second slides 46, 48 by respective shafts 51, 53 that are rotatably supported by respective bearings 50, 52 for angular movement in the directions indicated by the arrow θ. The shafts 51, 53 have respective holes 55, 57 defined therein. The casings 54, 56 house respective reflecting mirrors 58, 60 therein. First cylindrical tubes 62, 64 are vertically fixed to lower surfaces of the respective casings 54, 56, and second cylindrical tubes 66, 68 are vertically telescopically fitted respectively in and extend below the first cylindrical tubes 62, 64. The first cylindrical tubes 62, 64 and the second cylindrical tubes 66, 68 are coupled to each other by ball screws 70, 72 (see FIG. 1). The ball screws 70, 72 have ends connected to respective stepping motors 74, 76 fixed to outer circumferential surfaces of the first cylindrical tubes 62, 64 and opposite ends threaded in respective nuts 78, 80 fixed to outer circumferential surfaces of the second cylindrical tubes 66, 68. When the stepping motors 74, 76 are energized, the second cylindrical tubes 66, 68 are axially moved with respect to the first cylindrical tubes 62, 64 by the ball screws 70, 72 in the directions indicated by the arrow Z.

Figure 4:
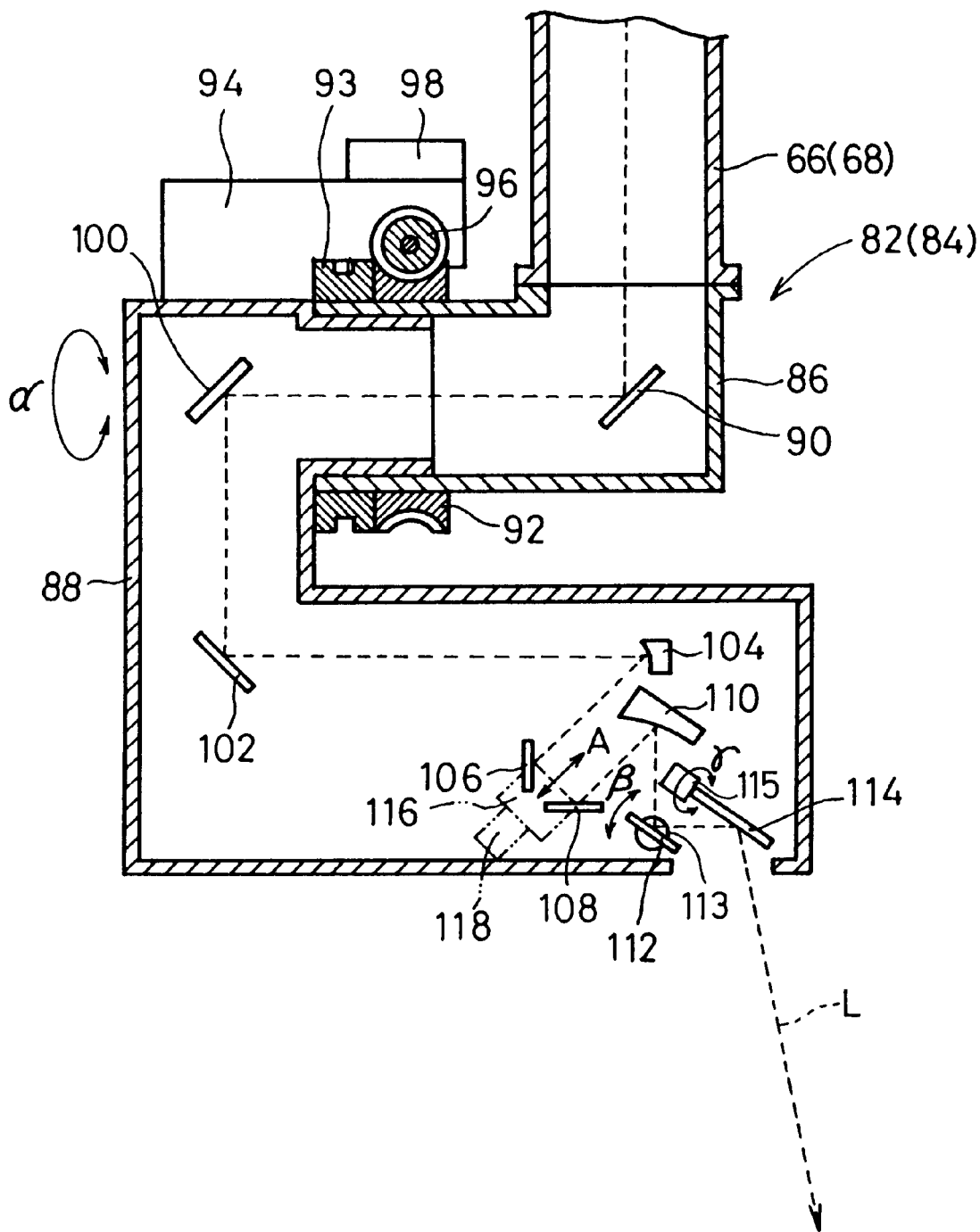
FIG. 4 is an enlarged fragmentary crosssectional view of a scan head of the welding robot shown in FIG. 3.

Scan heads 82, 84 are secured respectively to lower ends of the second cylindrical tubes 66, 68. As shown in FIG. 4, each of the scan heads 82, 84 has a housing 86 fixed to the lower end of one of the second cylindrical tubes 66, 68 and a housing 88 coupled to the housing 86 for angular movement in the directions indicated by the arrow α. The housing 86 accommodates a reflecting mirror 90 therein. The housing 86 has an end fitted over an end of the housing 88, and a worm wheel 92 and a rotation guide 93 are fixedly mounted on the end of the housing 86. The worm wheel 92 is held in mesh with a worm 96 supported on a bracket 94 which is affixed to the housing 88. The worm 96 can be rotated by a stepping motor 98 supported on the bracket 94. The rotation guide 93 is joined to the bracket 94.

The housing 88 accommodates reflecting mirrors 100, 102 therein. A laser beam L emitted from the laser beam emitting device 16 enters the casings 40, 44, is reflected by the mirrors 38, 42 and the mirrors 58, 60, passes through the first and second cylindrical tubes 66, 68 into the scan heads 82, 84 in which the laser beam L is reflected by the mirrors 90, 100, 102. The laser beam L reflected by the mirror 102 travels toward a parabolic mirror 104, two reflecting mirrors 106, 108, an elliptic mirror 110, and two scanning mirrors 112, 114 which are all accommodated in the housing 88. The reflecting mirrors 106, 108 which extend at a predetermined angle to each other are supported on a frame 116, and can be moved back and forth in the directions indicated by the arrow A by a stepping motor 118 that is coupled to the frame 116. The scanning mirrors 112, 114 can be angularly moved by respective servomotors 113, 115 in the respective directions indicated by the arrows β, γ for thereby deflecting the laser beam L.

As shown in FIGS. 1 and 2, the position detectors 20, 22 comprise CCD cameras 124, 126 which are fixed to the upper plate 28 by respective brackets 120, 122. The CCD cameras 124, 126 are positioned between the welding robots 12, 14 as shown in FIG. 1 and disposed one on each side of the workpiece W as shown in FIG. 2.

Figure 5:
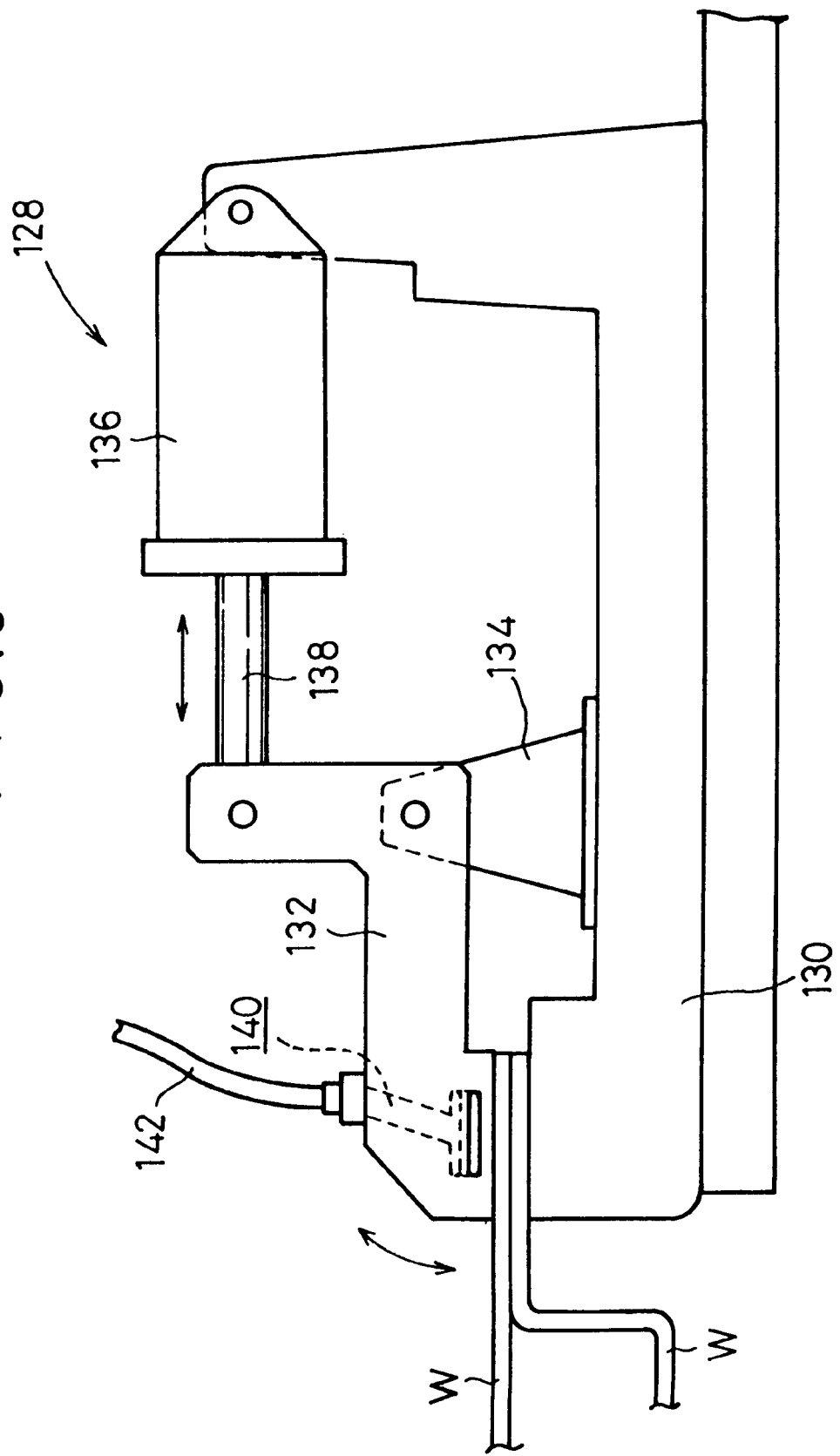
FIG. 5 is an enlarged side elevational view of a clamp mechanism of the laser beam welding apparatus according to the first embodiment.
Figure 6:
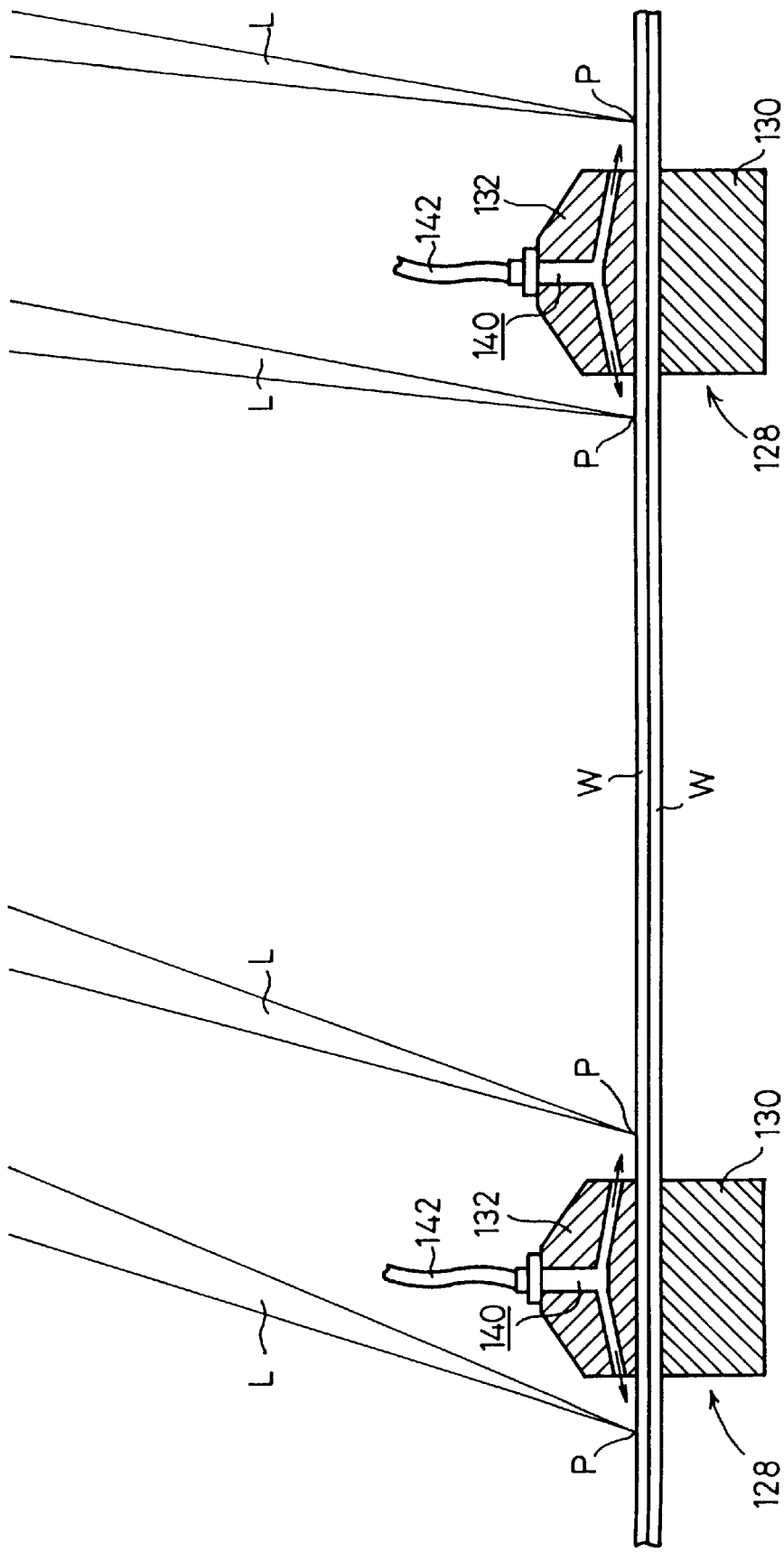
FIG. 6 is a cross-sectional view showing the manner in which a workpiece is welded at welding locations near clamp mechanisms.

The welding station also has a plurality of clamp mechanisms 128 each having a structure shown in FIGS. 5 and 6. Each of the clamp mechanisms 128 has a workpiece receiving jig 130 for supporting two workpiece panels W to be welded and a clamp 132 for sandwiching the workpiece panels W in coaction with the workpiece receiving jig 130. The clamp 132 has an L-shaped portion pivotally supported on a bracket 134 fixed to the workpiece receiving jig 130, and an end pivotally connected to a rod 138 of a cylinder 136 which is pivotally connected to the workpiece receiving jig 130. As shown in FIG. 6, the clamp 132 has a gas passage 140 defined therein which has ends opening at upper and opposite side surfaces of the clamp 132. The gas passage 140 is supplied with an inert gas such as an argon (Ar) gas through a tube 142 which is connected to the upper end of the gas passage 140.

Figure 7:
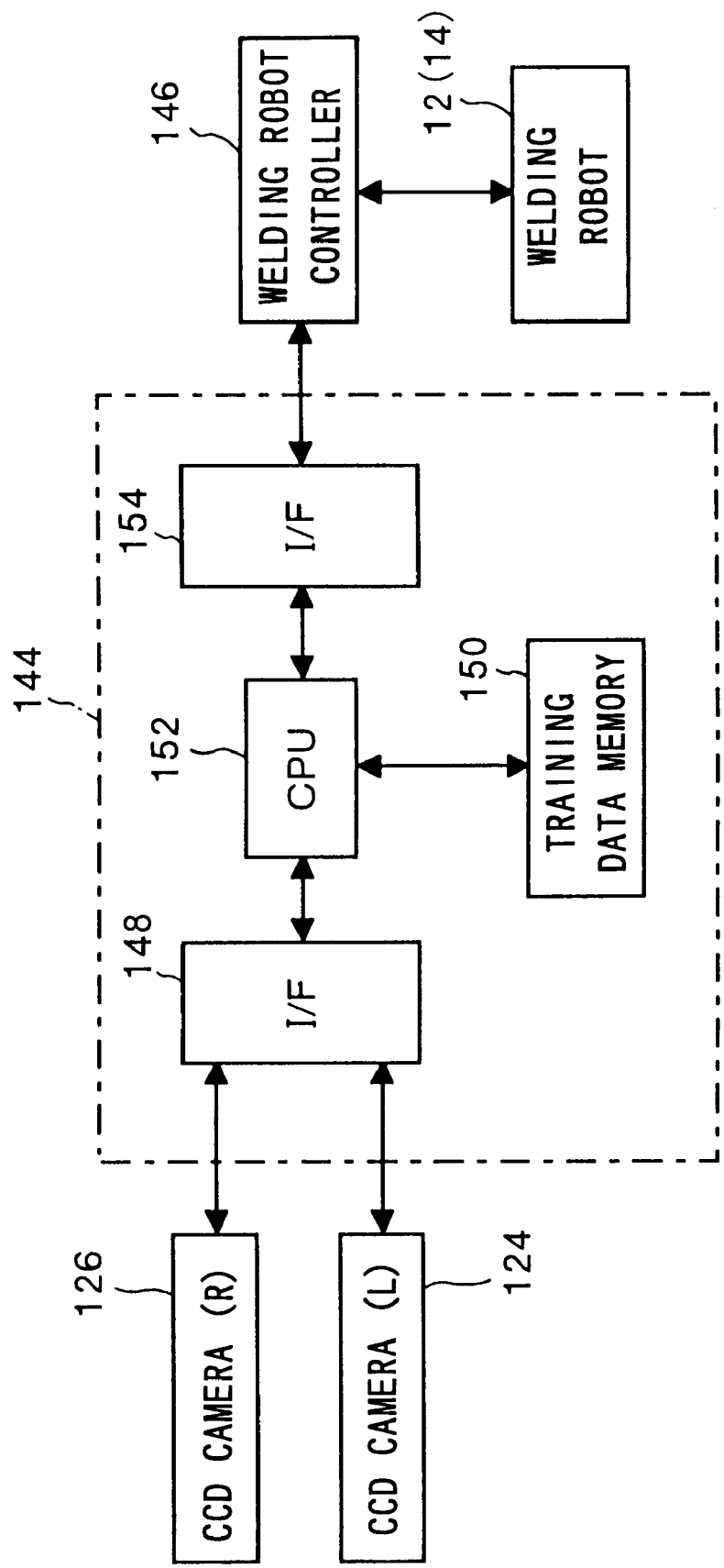
FIG. 7 is a block diagram of a control circuit including a training data correcting device.

FIG. 7 shows in block form a control circuit of the laser beam welding apparatus 10. The control circuit has a training data correcting device 144 for correcting training data for the welding robots 12, 14 with a positioning error of the workpiece W at the welding station based on image data produced by the CCD cameras 124, 126, and a welding robot controller 146 for controlling the welding robots 12, 14 based on the corrected training data. The training data correcting device 144 has an interface 148 for receiving signals from the CCD cameras 124, 126, a training data memory 150 for storing training data, a CPU 152 for processing data mainly to correct training data, and an interface 154 for transmitting corrected training data to the welding robot controller 146.

Operation of the laser beam welding apparatus 10 according to the first embodiment of the present invention will be described below.

A workpiece W, such as an automobile body, fixed to the delivery carriage 26 by the clamps 24 is delivered into the welding station by the feed mechanism 18. Regions of the workpiece W near locations to be welded are then held in position by the clamp mechanisms 128 shown in FIG. 5. Specifically, each region of outer and inner workpiece panels W is supported on the workpiece receiving jig 130, and sandwiched between the workpiece receiving jig 130 and the clamp 132 which is angularly displaced by the rod 138 of the cylinder 136.

The workpiece W thus fixed in position in the welding station is then positionally detected by the position detectors 20, 22, and a positional error of the workpiece W with respect to a predetermined reference position is determined.

Specifically, the CCD cameras 124, 126 of the position detectors 20, 22 positioned one on each side of the workpiece W captures an image of a certain region of the workpiece W, and transmit captured image data through the interface 148 to the CPU 142 of the training data correcting device 144. The certain region of the workpiece W may be a region which represents a typical dimensional accuracy of the workpiece W, e.g., a corner of a front window opening, a corner of a rear window opening, or a reference point on a central pillar. The CPU 142 then compares the image data with reference image data of the certain region which has been stored, thus determining a positional error of the workpiece W with respect to a predetermined reference position. More specifically, reference image data of a certain region of the workpiece W which has accurately been set in a reference position is stored, and image data captured when the certain region of the workpiece W is imaged by the CCD cameras 124, 126 is compared with the stored reference image data, thereby determining the difference between the compared image data. A distance by which the image data is displaced to minimize the difference is then determined as a positional error.

Based on the positional error thus determined, the CPU 152 corrects training data for the welding robots 12, 14 which has been stored in the training data memory 150, and then transmits the corrected training data through the interface 154 to the welding robot controller 146. According to the corrected training data, the welding robot controller 146 actuates the welding robots 12, 14 to move to given positions, and then operates the welding robots 12, 14 to weld the workpiece W. Since the training data has been corrected to eliminate the positional error, the welding robots 12, 14 can weld the workpiece W highly accurately. Since the laser beam welding apparatus 10 has such a training data correcting capability, it is not necessary to position the workpiece W highly accurately with respect to the welding station, and hence the laser beam welding apparatus 10 may be implemented with relatively simple equipment.

A welding process carried out by the welding robots 12, 14 will be described in detail below.

According to instructions from the welding robot controller 146 based on the corrected training data, the welding robots 12, 14 insert their scan heads 82, 84 into openings of the workpiece W, e.g., a front window opening and a rear window opening of the workpiece W. Specifically, the first slides 34, 36 move along the guide rails 30, 32 the directions indicated by the arrow X, and the second slides 46, 48 move along the respective first slides 34, 36 in the directions indicated by the arrow Y. The scan heads 82, 84, the casings 54, 56, the first cylindrical tubes 62, 64, and the second cylindrical tubes 66, 68 are angularly moved about the shafts 51, 53 in the directions indicated by the arrow θ.

In order to apply the laser beam L to given welding locations on the workpiece W, the stepping motors 74, 76 are energized to rotate the ball screws 70, 72 meshing with the nuts 78, 80 for thereby displacing the second cylindrical tubes 66, 68 with respect to the first cylindrical tubes 62, 64 in the directions indicated by the arrow Z. At the same time, the stepping motor 98 on each of the scan heads 82, 84 is also energized to rotate the worm 96 meshing with the worm wheel 92 for thereby angularly moving the housing 88 in the directions indicated by the arrow á. As a result, the scan heads 82, 84 are positioned in respective given positions within the workpiece W, whereupon the laser beam welding apparatus is ready for welding the workpiece W.

The laser beam L emitted from the laser beam emitting device 16 is reflected by the shift mirror 38 in the casing 40 at the end of the first slide 34 of the welding robot 12, and travels through the hole 55 in the shaft 51 toward the reflecting mirror 58. The laser beam L is reflected by the reflecting mirror 58 into the scan head 82 through the first and second cylindrical tubes 62, 66. In the scan head 82, the laser beam L is reflected by the reflecting mirrors 90, 100, 102 and then reflected and converged by the parabolic mirror 104, after which the laser beam L is reflected by the reflecting mirrors 106, 108 toward the elliptic mirror 110. The laser beam L which is reflected and converged by the elliptic mirror 110 is deflected by the scanning mirrors 112, 114 that are angularly moved by the servomotors 113, 115 in the respective directions indicated by the arrows β, γ, while at the same time the laser beam L is focused into a desired beam spot by the reflecting mirrors 106, 108 that are moved by the stepping motor 118 in the directions indicated by the arrow A. The laser beam L thus controlled welds the workpiece W at a plurality of welding locations which have been taught in advance. The laser beam L emitted from the laser beam emitting device 16 is also reflected by the reflecting mirror 42 in the casing 44 at the end of the first slide 36 of the welding robot 14, and travels through the hole 57 in the shaft 53 toward the reflecting mirror 60. The scan head 84 is displaced in the same manner as described above with respect to the scan head 82 for thereby welding the workpiece W.

As shown in FIGS. 5 and 6, regions near points P to be welded of the workpiece panels W are clamped by the clamp mechanisms 128, and an inert gas such as an argon gas is supplied to the points P through the gas passages 140. Therefore, the points P to be welded can be welded by the laser beam L while they are being prevented from being oxidized by the inert gas.

Since the scanning mirrors 112, 114 are angularly moved and the reflecting mirrors 106, 108 are moved while the laser beam L is welding the workpiece W, the welding robots 12, 14 can effect spot welding and also continuous welding, i.e., seam welding, on the workpiece W along various patterns such as circular and rectangular patterns. When the welding process at one welding point is completed, the welding robots 12, 14 are controlled in the directions indicated by the arrows X, Y, θ, Z, α to displace the scan heads 82, 84 to a next welding point. Then, the next welding point is welded while the welding robots 12, 14 are controlled in the directions indicated by the arrows β, γ, A based on the training data. Because it is not necessary to move the scan heads 82, 84 in their entirety, the workpiece W can be welded highly efficiently at a plurality of welding points.

The scan heads 82, 84 may be spaced a sufficient distance from the welding points of the workpiece W while these welding points are being welded. Accordingly, the scan heads 82, 84 are not subject to sputtering during the welding process, and hence can weld the workpiece W under good conditions. Since the laser beam L is used to weld the workpiece W, the scan heads 82, 84 are free from the problem of sticking and wear of a welding tip, and do not need to be dressed. Consequently, the welding robots 12, 14 can weld the workpiece W highly efficiently.

Figure 8:
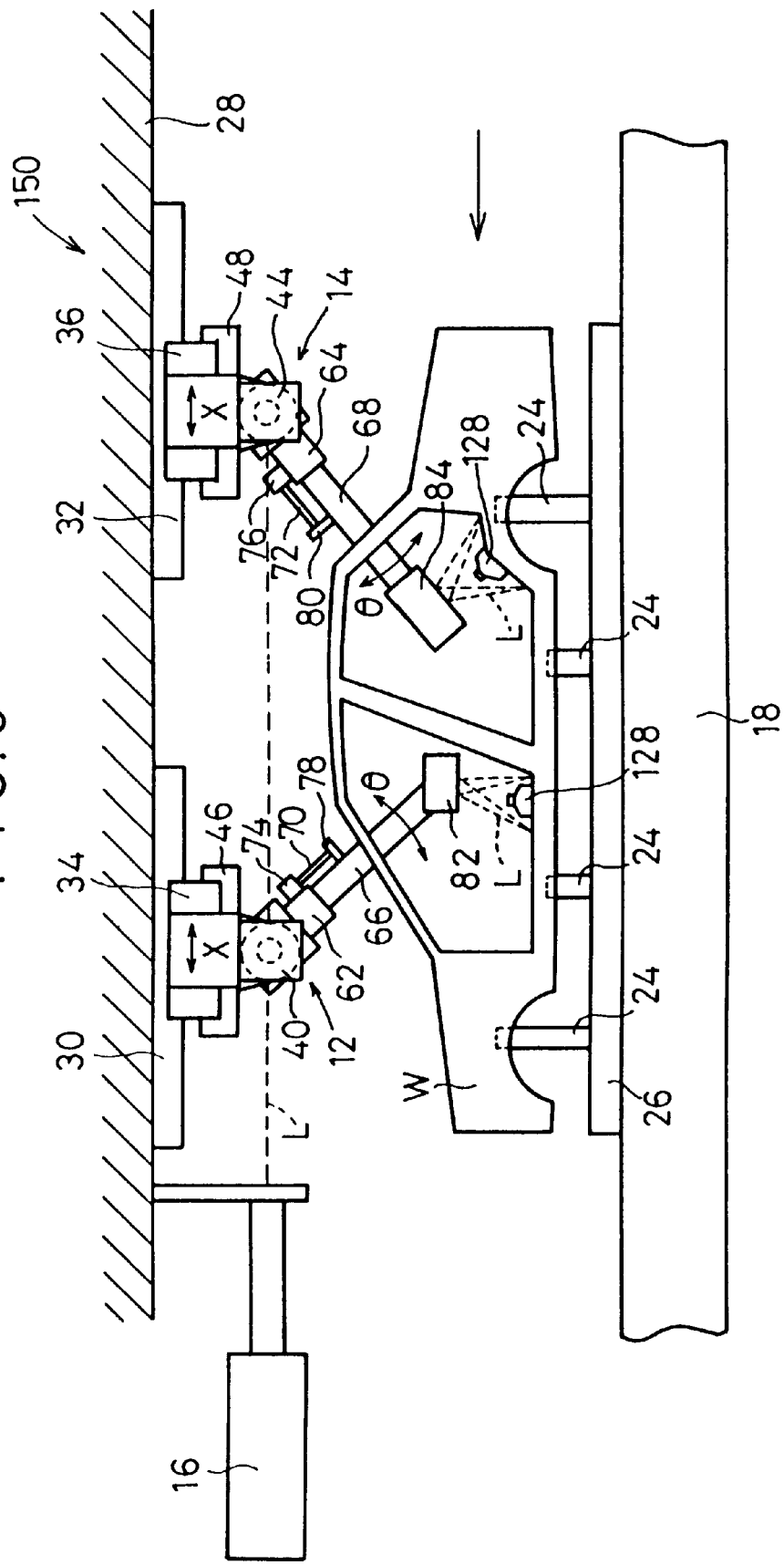
FIG. 8 is a side elevational view of a laser beam welding apparatus according to a second embodiment of the present invention.
Figure 9:
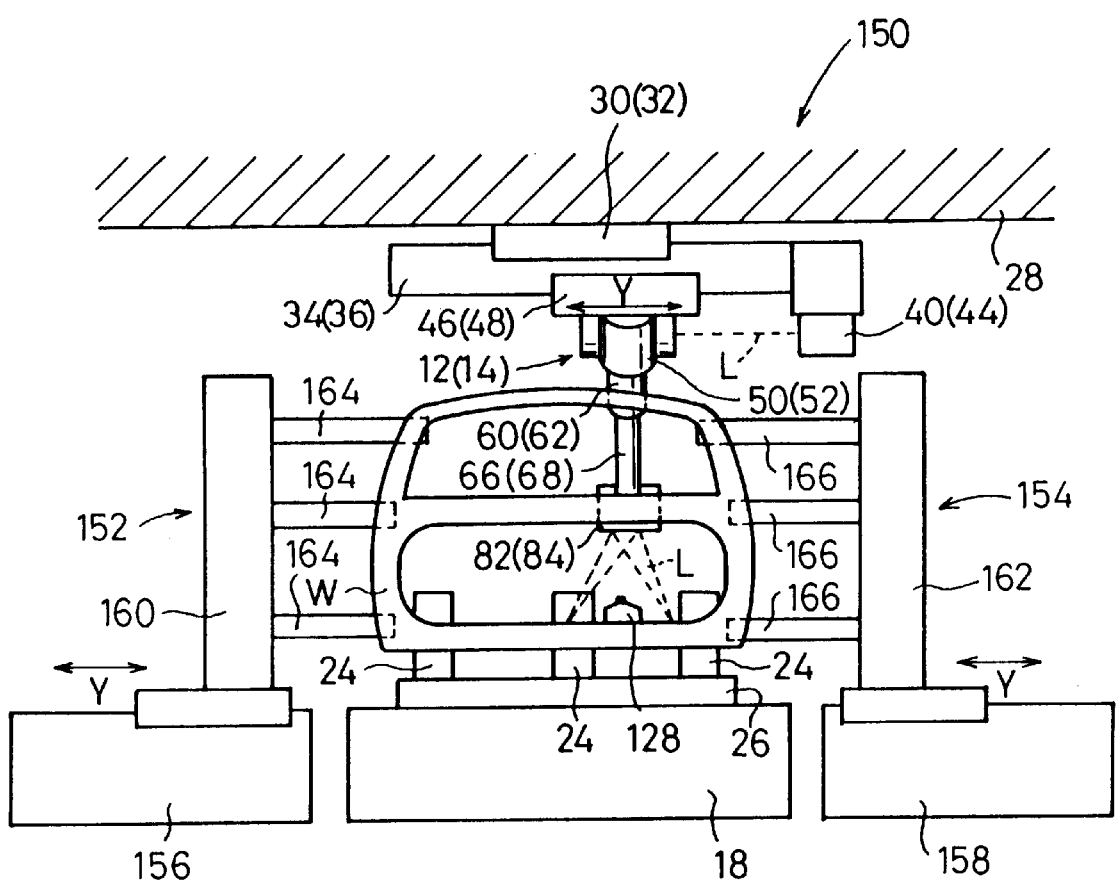
FIG. 9 is a front elevational view of the laser beam welding apparatus according to the second embodiment.

FIGS. 8 and 9 show a laser beam welding apparatus 150 according to a second embodiment of the present invention. Those parts of the laser beam welding apparatus 150 which are identical to those of the laser beam welding apparatus 10 according to the first embodiment are denoted by identical reference numerals and representations, and will not be described in detail below.

The laser beam welding apparatus 150 comprises two welding robots 12, 14 installed in a welding station, a laser beam emitting device 16 for supplying a laser beam L to the welding robots 12, 14, a feed mechanism 18 for delivering a workpiece W, such as an automobile body, to the welding station, and two positioning mechanisms 152, 154 positioned one on each side of the welding station for positioning the workpiece W that has been delivered to the welding station with respect to a reference position.

The positioning mechanisms 152, 154 are disposed one on each side of the feed mechanism 18 in the welding station, and have respective bases 156, 158, respective columns 160, 162 movable along the respective bases 156, 158 in the directions indicated by the arrow Y, and respective sets of clamps 164, 166 mounted respectively on the columns 160, 162 for positioning and securing the workpiece W.

A workpiece W, such as an automobile body, fixed to the delivery carriage 26 by the clamps 24 is delivered into the welding station by the feed mechanism 18. Then, the positioning mechanisms 152, 154 are moved along the bases 156, 158 in the directions indicated by the arrow Y toward the workpiece W in the welding station, so that the clamps 164, 166 on the columns 160, 162 clamp respective regions of the workpiece W for thereby positioning and securing the workpiece W with respect to the reference position. After the workpiece W has been positioned and secured, regions near locations to be welded of the workpiece W are sandwiched in place by the clamp mechanisms 128 shown in FIG. 5. Then, the welding robots 12, 14 are moved to given positions according to the training data, and weld the workpiece W in the same manner as described with respect to the laser beam welding apparatus 10 according to the first embodiment.

Although certain preferred embodiments of the present invention have been shown and described in detail, it should be understood that various changes and modifications may be made therein without departing from the scope of the appended claims.

What is claimed is:

1. A laser beam welding apparatus comprising:

a positioning mechanism for positioning and securing a workpiece delivered into a welding station with respect to a reference position:

an error detecting mechanism for detecting a positioning error of a workpiece delivered into a welding station with respect to said reference position;

a laser beam emitting device for emitting a laser beam to be applied to a plurality of locations to be welded on the workpiece;

a welding robot having a scan head for guiding the laser beam to a plurality of spot locations to be welded on the workpiece according to training data, and a mechanism for moving said scan head to positions to weld said spot locations according to said training data; and a training data correcting unit for correcting the training data based on the positioning error detected by said error detecting mechanism to thereby determine corrected spot locations;

wherein said scan head comprises a beam deflecting optical system for guiding the laser beam to said corrected spot locations to be welded on the workpiece and focusing optical system for focusing the laser beam onto said corrected spot locations to be welded on the workpiece, in accordance with corrected training data, and means for actuating said beam deflecting optical system and said focusing optical system within said scan head and independently from any exterior movement of said scan head while said scan head is held at a predetermined fixed position with respect to said workpiece; and wherein after said scan head is positioned by said mechanism for moving at said predetermined fixed position, said beam deflecting optical system and said focusing optical system of said scan head are actuated to weld the workpiece at said plurality of corrected spot locations with said beam.

2. A laser beam welding apparatus according to claim 1, wherein said error detecting mechanism comprises: an imaging unit for generating image data of a predetermined region of said workpiece; and an error calculating unit for determining the difference between a position of said predetermined region obtained from said image data and said reference position as said positioning error.

3. A laser beam welding apparatus according to claim 1, wherein said beam deflecting optical system further comprises an angularly movable scanning mirror disposed downstream from said focusing optical system for deflecting said laser beam, said scanning mirror being angularly movable with respect to said focusing optical system for deflecting said laser beam to a plurality of welding spots on the workpiece.

4. A laser beam welding apparatus according to claim 1, wherein said welding robot has a light guide passage for guiding the laser beam emitted from said laser beam emitting device to said scan head.

5. A laser beam welding apparatus according to claim 1, wherein said welding station has a clamp mechanism for clamping regions of the workpiece near said locations to be welded, said clamp mechanism having a gas supply device for supplying an inert gas to the locations to be welded.

6. A laser beam working apparatus according to claim 1, wherein said mechanism for moving comprises respective mechanisms for moving the scan head independently with respect to five axes (X, Y, Z, θ and α), said mechanisms comprising first and second slides for movement in respective orthogonal (X, Y) directions, a first tube angularly movable about an axis (θ); a second tube which is extendible along a direction (Z) perpendicular to said respective orthogonal directions, and means for rotating a scan head housing about another axis (α).

* * * * *